United States Patent
MacDermid

(10) Patent No.: US 10,318,732 B2
(45) Date of Patent: Jun. 11, 2019

(54) PREVENTION OF CROSS SITE SCRIPTING ATTACKS USING AUTOMATIC GENERATION OF CONTENT SECURITY POLICY HEADERS AND SPLITTING OF CONTENT TO ENABLE CONTENT SECURITY POLICY

(71) Applicant: Trend Micro Incorporated, Tokyo (JP)

(72) Inventor: Kenny MacDermid, Bedford (CA)

(73) Assignee: TREND MICRO INCORPORATED, Tokyo (JP)

( * ) Notice: Subject to any disclaimer, the term of this patent is extended or adjusted under 35 U.S.C. 154(b) by 108 days.

(21) Appl. No.: 15/512,376

(22) PCT Filed: Sep. 18, 2015

(86) PCT No.: PCT/CA2015/050912
§ 371 (c)(1),
(2) Date: Mar. 17, 2017

(87) PCT Pub. No.: WO2016/041084
PCT Pub. Date: Mar. 24, 2016

(65) Prior Publication Data
US 2017/0277892 A1    Sep. 28, 2017

Related U.S. Application Data

(60) Provisional application No. 62/052,157, filed on Sep. 18, 2014.

(51) Int. Cl.
*H04L 29/06*    (2006.01)
*G06F 21/56*    (2013.01)
(Continued)

(52) U.S. Cl.
CPC .......... *G06F 21/566* (2013.01); *G06F 21/128* (2013.01); *G06F 21/54* (2013.01);
(Continued)

(58) Field of Classification Search
CPC ...... G06F 21/566; G06F 21/128; G06F 21/54; G06F 21/577; H04L 63/1466; H04L 63/1433
See application file for complete search history.

(56) References Cited

U.S. PATENT DOCUMENTS

| | | | |
|---|---|---|---|
| 7,343,626 B1 | 3/2008 | Gallagher | |
| 8,112,799 B1 | 2/2012 | Loiodice et al. | |

(Continued)

FOREIGN PATENT DOCUMENTS

WO    WO-2016041084    3/2016

OTHER PUBLICATIONS

Doupe, Adam, et al., "deDacota: Toward Preventing Server-Side XSS via Automatic Code and Data Separation", Proceedings of the 2013 ACM SIGSAC Conference on Computer and Communications Security, CCS '13, Nov. 4-8, 2013, Berlin, Germany, (Nov. 4, 2013), 12 pgs.*

(Continued)

*Primary Examiner* — Ghodrat Jamshidi
(74) *Attorney, Agent, or Firm* — Okamoto & Benedicto LLP

(57) ABSTRACT

The present disclosure provides a method and system for transforming web application output that is vulnerable to XSS attacks to CSP-compliant web application output. This transformation is accomplished by parsing the output code to identify headers and script and splitting the headers and script to form CSP-compliant web application output.

12 Claims, 3 Drawing Sheets

(51) Int. Cl.
*G06F 21/54* (2013.01)
*G06F 21/12* (2013.01)
*G06F 21/57* (2013.01)

(52) U.S. Cl.
CPC ........ *H04L 63/1466* (2013.01); *G06F 21/577* (2013.01); *H04L 63/1433* (2013.01)

(56) References Cited

U.S. PATENT DOCUMENTS

| | | | |
|---|---|---|---|
| 8,448,241 B1 | 5/2013 | Kadakia | |
| 8,578,482 B1 | 11/2013 | Yang et al. | |
| 8,615,804 B2 | 12/2013 | Mui et al. | |
| 8,752,183 B1 | 6/2014 | Heiderich et al. | |
| 9,264,395 B1* | 2/2016 | Stamos | H04L 61/1511 |
| 2005/0235145 A1* | 10/2005 | Slick | H04L 63/0428 |
| | | | 713/165 |
| 2008/0301766 A1* | 12/2008 | Makino | G06F 21/51 |
| | | | 726/1 |
| 2009/0288138 A1* | 11/2009 | Kalofonos | H04L 9/3073 |
| | | | 726/2 |
| 2010/0275265 A1* | 10/2010 | Fiske | G06F 21/32 |
| | | | 726/26 |
| 2011/0225426 A1* | 9/2011 | Agarwal | G06F 21/41 |
| | | | 713/175 |
| 2011/0289546 A1* | 11/2011 | Pieczul | G06F 21/53 |
| | | | 726/1 |
| 2012/0090026 A1* | 4/2012 | Andrews | G06F 17/3089 |
| | | | 726/22 |
| 2013/0086247 A1* | 4/2013 | Burckart | H04L 67/2823 |
| | | | 709/224 |
| 2013/0227078 A1* | 8/2013 | Wei | H04L 67/2814 |
| | | | 709/219 |
| 2014/0373087 A1* | 12/2014 | Ciu | H04L 63/145 |
| | | | 726/1 |
| 2015/0007251 A1* | 1/2015 | Johns | H04L 63/20 |
| | | | 726/1 |
| 2015/0278531 A1* | 10/2015 | Smith | G06F 21/6218 |
| | | | 713/165 |

OTHER PUBLICATIONS

"International Application No. PCT/CA2015/050912, International Search Report and Written Opinion dated Dec. 2, 2015", (Dec. 2, 2015), 11 pgs.

Barth, Adam, et al., "Content Security Policy 1.1: W3C Working Draft", Copyright 2010-2014 W3C; http://www.w3.org/TR/2014/WD-CSP11-20140211, (Feb. 11, 2014), 21 pgs.

* cited by examiner

PREVENTION OF CROSS SITE SCRIPTING ATTACKS USING AUTOMATIC GENERATION OF CONTENT SECURITY POLICY HEADERS AND SPLITTING OF CONTENT TO ENABLE CONTENT SECURITY POLICY

PRIORITY CLAIM TO RELATED APPLICATIONS

This application is a U.S. national stage application filed under 35 U.S.C. § 371 from International Application Serial No. PCT/CA2015/050912, which was filed 18 Sep. 2015, and published as WO2016/041084 on 24 Mar. 2016, and which claims priority to U.S. Application No. 62/052,157, filed 18 Sep. 2014, which applications and publication are incorporated by reference as if reproduced herein and made a part hereof in their entirety, and the benefit of priority of each of which is claimed herein.

TECHNICAL FIELD

The present invention relates to computer security and, in particular, to techniques for defending against cross site scripting (XSS) attacks.

BACKGROUND

Cross site scripting (XSS) remains one of the most prevalent web application vulnerabilities today, and is a leading cause of data breaches. One of the most promising solutions to combat XSS is the W3C standard: Content Security Policy (CSP). Content Security Policy requires that the web application be written with certain constraints: namely that all script (code) components of the application be in separate files from the HTML (presentation) components, and that the Content Security Policy HTTP Header is used to ascertain to the browser where the code components can be located. Using this mechanism, even if an attacker were able to successfully inject into a web application, the injected code would not run as it would not have been specified in the CSP header (i.e. it did not come from the server).

The vast majority of applications today are not written with this separation of code and presentation, and as such are incapable of using the CSP Header.

Some technologies for defending against XSS attacks are disclosed in U.S. Pat. No. 8,752,183 (Systems and methods for client-side vulnerability scanning and detection), U.S. Pat. No. 8,615,804 (Complementary character encoding for preventing input injection in web applications), U.S. Pat. No. 8,578,482 (Cross Site Script Detection and Prevention), U.S. Pat. No. 7,343,626 (Automated detection of cross site scripting vulnerabilities), U.S. Pat. No. 8,448,241 (Browser extension for checking website susceptibility to cross site scripting) and U.S. Pat. No. 8,112,799 (Method, system, and computer program product for avoiding cross-site scripting attacks).

These prior-art technologies, however, do not address the problem of vulnerabilities created by improperly written web applications.

SUMMARY

The present invention involves the automatic modification of the output of an application (the web page which includes both scripts and presentation content) and modifying it in real time by doing the following:
 1. Stripping out the code components and replacing them with placeholders to dynamically generated script placeholders
 2. Adding the correct Content Security Policy headers
 3. Serving these generated script placeholders as script files The invention thus provides XSS protection using Content Security Policy headers for sites that were not designed for it, with no developer intervention.

In some embodiments, CSP protection can be applied by just providing a known, precomputed hash of the script in the Content Security Policy header. In such cases, it is may not be necessary to generate a separate script artifact—but rather compute and add the hash of the script code to the CSP headers.

The summary is intended to highlight certain main aspects of the present invention but is not intended to define all of the inventive aspects of the present invention.

BRIEF DESCRIPTION OF THE DRAWINGS

The present invention will be further understood from the following detailed description with reference to the drawings in which.

DETAILED DESCRIPTION

Figure 1:
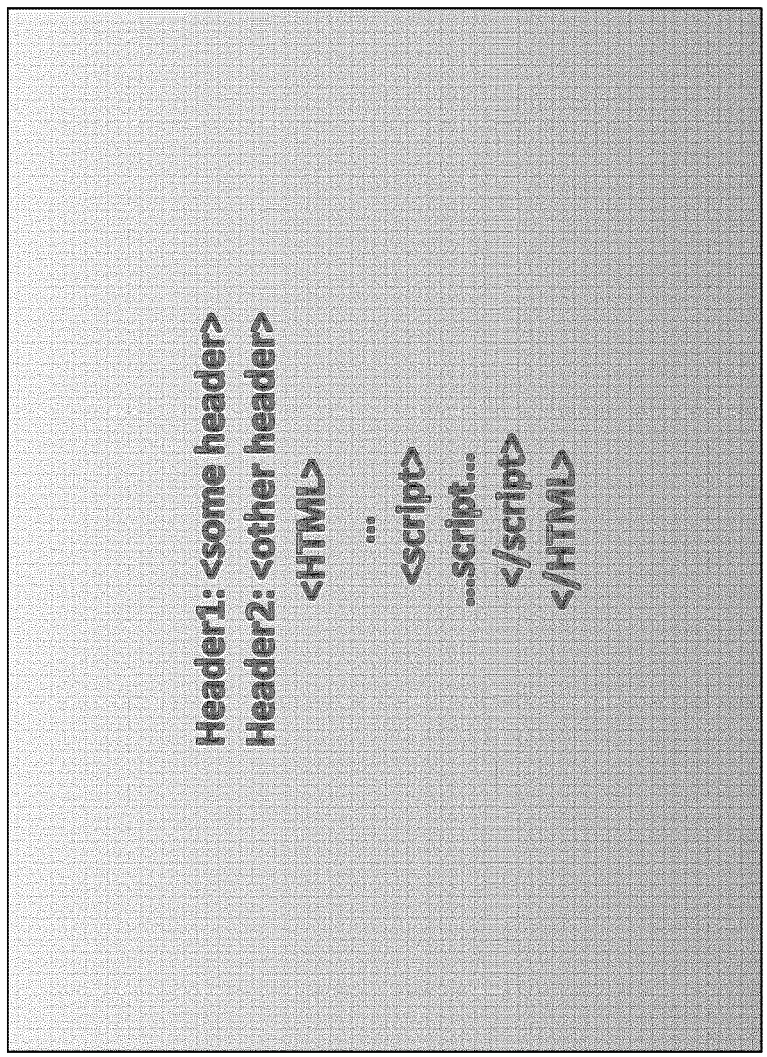
FIG. 1 depicts web application output that contains interleaved script and presentation (HTML) markup.
Figure 2:
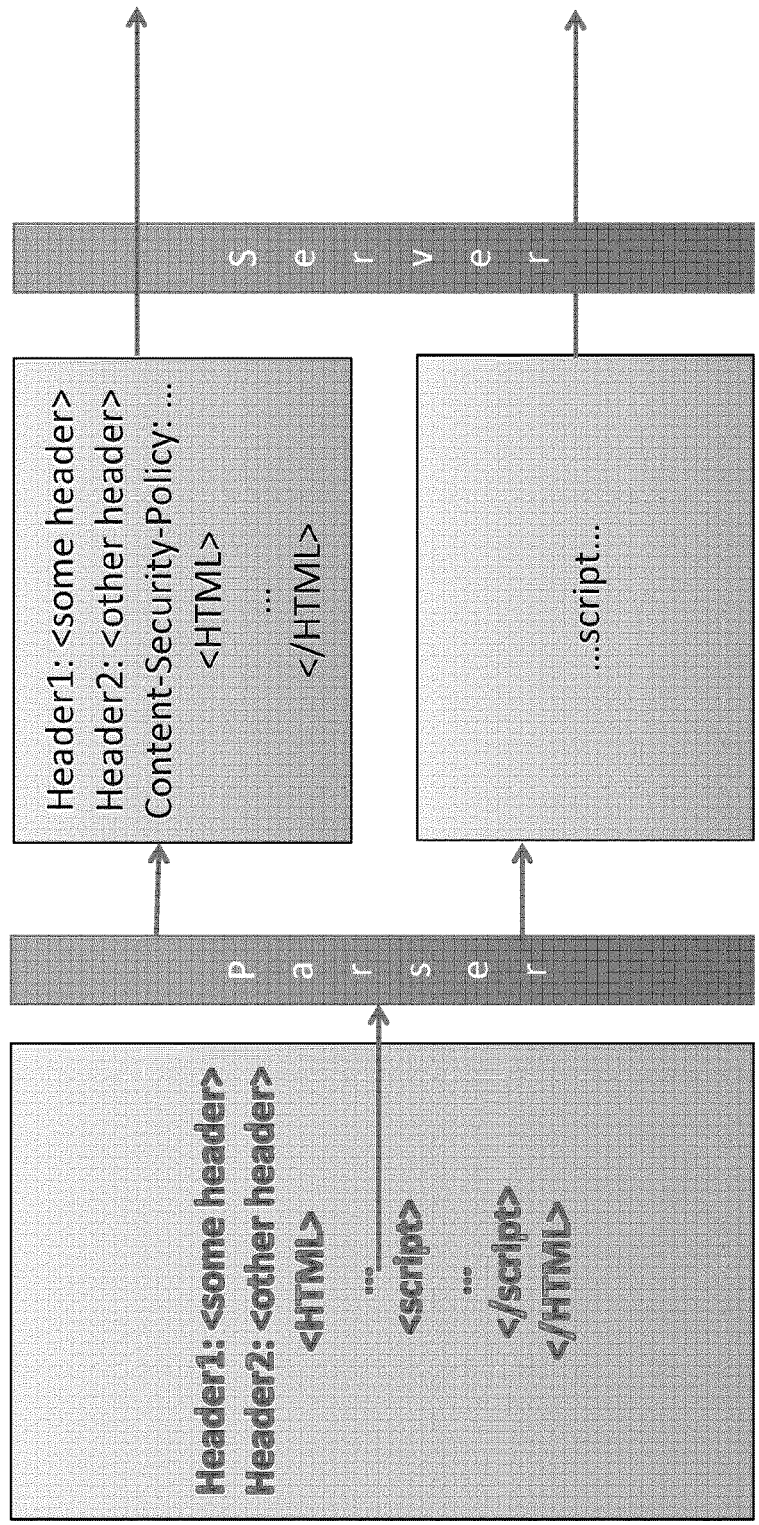
FIG. 2 illustrates a method of automatically parsing and splitting the script and presentation content to generate CSP-compliant web application output.

In general, the present invention provides a technique for automatically transforming web application output that is vulnerable to XSS attacks to CSP-compliant web application output. This technique is performed automatically (without user or developer intervention). This transformation is accomplished by parsing the output code to identify headers and script and splitting the headers and script to form CSP-compliant web application output. FIG. 1 shows depicts web application output that contains interleaved script and presentation (HTML) markup that is vulnerable to XSS attacks. FIG. 2 illustrates the method of automatically parsing and splitting the script and presentation content to generate CSP-compliant web application output that is no longer vulnerable to XSS attacks.

The technique is said to be automatic in the sense that the parsing and splitting occur without the development having to re-code the web page. However, the trigger that causes the automatic parsing and splitting may be a user command.

The system in accordance with at least one embodiment of the present invention has the following components:

Web Application: A typical web application that generates HTML, interspersed with inline JavaScript. The invention applies to web applications that do not employ Content Security Policy properly. In response to a web request, the web application will return a response that includes HTTP Headers (which may or may not include CSP Headers) and the Unsafe web page.

Unsafe web page: Web page output prior to the transformation performed by the system in accordance with the present invention. The unsafe web page may or may not be vulnerable to XSS prior to transformation (modification) but becomes a safe web page compliant with CSP as a result of the transformation.

Parser: The parser is programmed to parse the Unsafe web page, to split the content into script components and presentation components, and to generate three artifacts:

1. Presentation Layer: HTML output that is identical in presentation to the Unsafe web page, but with XSS-safe references to script components 2. Script artifact: a separate script file that contains all the necessary script code required to maintain complete functionality of the original unsafe web page 3. Updated headers to include the proper Content-Security-Policy headers These artifacts combined are called "XSS-Free Output", and are functionally identical to the unsafe web page, albeit immune to XSS attacks because of the proper application of Content Security Policy.

Depending on whether the page can be made eval( ) free or not will determine how secure the headers supplied will be. In the case where the page contains no eval code, the header will be:

Content-Security-Policy: script-src 'self'; object-src 'self' or

Content-Security-Policy: script-src 'self' https://external-.domain.example; object-src: 'self';

In the case where the page contains evals that cannot be rewritten dynamically:

Content-Security-Policy: script-src 'self' 'unsafe-eval' https://extrenal.domain.example; object-src: 'self';

Server: The server serves the XSS-Free Output.

It is to be noted that the server and the parser are logical abstractions and thus may both be present in the same software component. The parser can be added via one of many ways. It could be a plugin (or middleware) in the application stack, or it could be just a network proxy (that sits between the server and an end user). Where the processing is injected directly in to the application, the view templates can be used to provide additional information to the parser as to what scripts are expected. Code injected to preprocess the templates before handling by the server is run. Non-dynamic javascript is replaced with placeholders and modifications are made as required to aid in post processing. Removed javascript is passed to a temporary nonce file server. The server performs its normal template processing. Code injected to postprocess the template engine output runs. Dynamic JavaScript is identified with the help of the preprocessor and replace with placeholders. Removed JavaScript is added to the file server. CSP headers are added to the reply. File server code is modified to also serve the removed JavaScript as a separate file.

For example, where a page contains one or more script tags in the html head, these elements are pulled into a separate script file. These script files are then included as a script source instead of having the script directly in the page.

Consider the example below in which embedded <script>s are moved to the nonce file. Event listeners are moved to the nonce file, with dynamically generated IDs created where required.

```
doc.html:
<html>
<head>
<script>
function main( ) {
}
function clickHandler(e) {
}
</script>
<head>
 <body onload="main( );">
  <script>alert("alert");</script>
  <button onclick="clickHandler(this)">
 </body>
</html>
-end of doc.html
```

This will become two files, nonce.js and doc.html:

```
nonce.js:
function main( ) {
}
function clickHandler(e) {
}
document.addEventListener('DOMContentLoaded', function( ) {
alert("alert");
document.querySelector('#NONCE2').addEventListener('click'),
clickHandler);
main( );
}
- end of nonce.js
```

```
doc.html:
<html>
<head>
<script src="nonce.js"></script>
</head>
<body>
<button id="NONCE2">
</body>
</html>
- end of doc.html
```

Note that the script-src directive restricts which scripts the protected resource can execute.

In some embodiments, a precomputed hash of the script may be added to the Content Security Policy header instead of generating a separate script artefact. This may be achieved using a hashing component that computes a hash of the script code and adds the hash of the script code to the CSP header.

Although the foregoing technology is best implemented using a cloud service, in other embodiments the cloud service may be replaced by a server cluster or even a single server. Each server is a computing device having a processor coupled to a memory and to a data communication port (e.g. modem, network adapter, etc.) for data communication with a network to which the server is connected. The server may include various input/output (I/O) devices and peripherals. The processor and memory cooperate to execute instructions in the form of software code for causing the computing device (server, cluster or cloud service as the case may be) to perform the acts or operations of the novel methods described herein.

Figure 3:
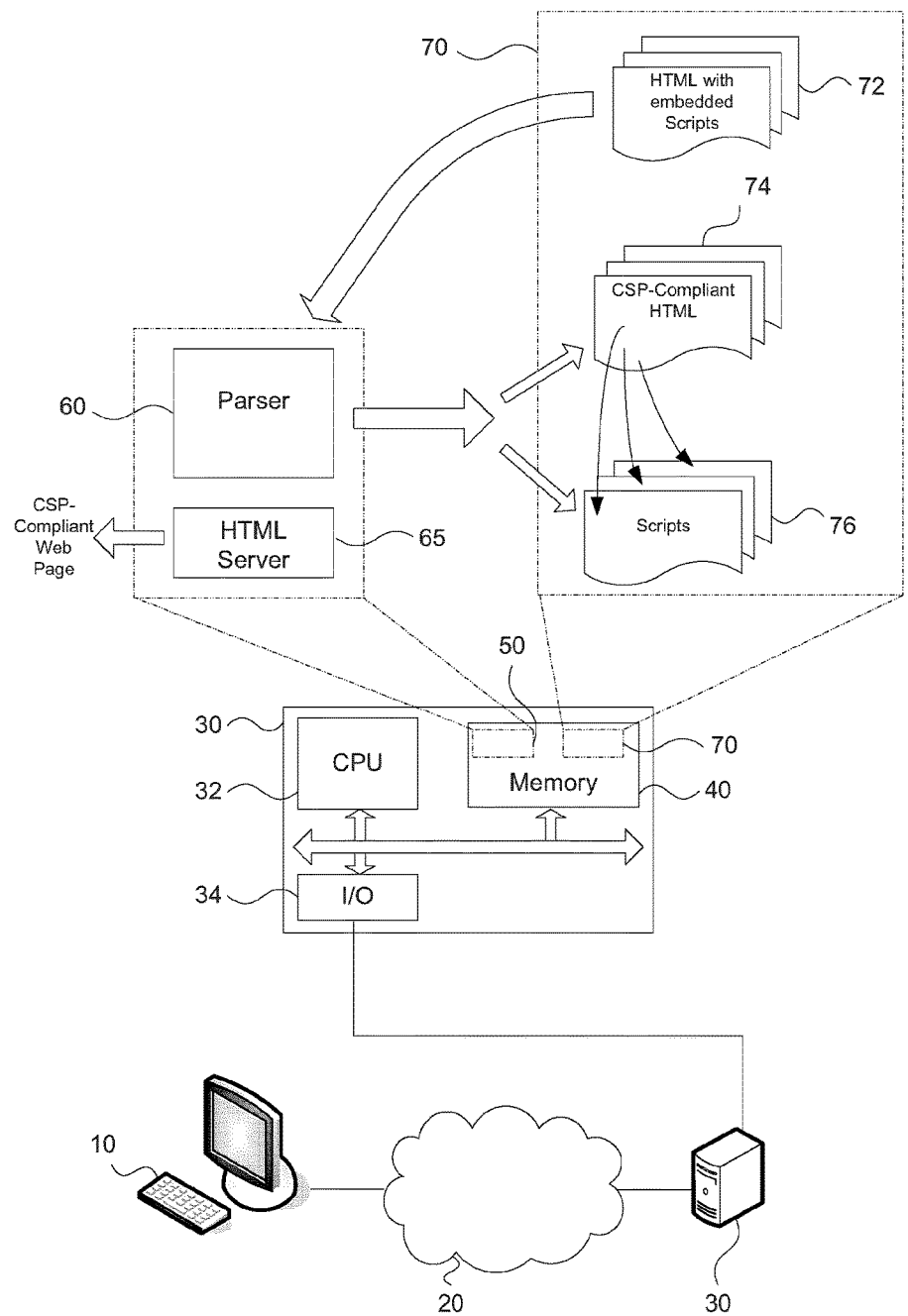
FIG. 3 illustrates a system that implements the method of FIG. 2.

A simplified schematic view of a system implementing the present invention is depicted by way of example in FIG. 3. The system illustrated by way of example in FIG. 3 includes a computer (or computing device) 10 that is connected via the Internet (or other data network) to a server 30 (or to a server cluster or cloud service). The server 30 includes a CPU (microprocessor) 32, one or more input/output (I/O) devices or ports 34 and a memory 40 that may provide both volatile and non-volatile storage means (RAM and ROM). In the memory 40 is a memory sector, partition or portion 50 storing code for a parser 60 (i.e. code-parsing application or module) and an HTML server 65 which are executable by the CPU. Another memory sector, partition or portion 70 stores HTML code 72 for more or web pages or web apps. This unmodified code has inline (i.e. embedded or interleaved) scripts and thus is not CSP compliant and hence vulnerable to XSS attacks. According to embodiments of the present invention, the unmodified code with inline scripts is then processed (cleaned or transformed) to remove the inline scripts, thereby transforming the code into CSP-compliant HTML 74 by the parser 60. The parser 60 may include a splitter module or component (or builder module) for splitting the code into presentation content and scripts and for building new files for storage in the memory. New script files are built so that the scripts 76 are stored separately. The CSP compliant HTML 74 is stored with references, placeholders or links to the scripts 76.

Any of the methods disclosed herein may be implemented in hardware, software, firmware or any combination thereof. Where implemented as software, the method steps, acts or operations may be programmed or coded as computer-readable instructions and recorded electronically, magnetically or optically on a non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means, memory device or medium that contains, records, or stores a computer program or application to be executed or run by a processor (or microprocessor) of a computer (or computing device or other instruction-execution apparatus). The computer-readable medium may be electronic, magnetic, optical, electromagnetic, infrared or any semiconductor system or device. For example, computer executable code to perform the methods disclosed herein may be tangibly recorded on a non-transitory computer-readable medium including, but not limited to, a floppy-disk, a CD-ROM, a DVD, RAM, ROM, EPROM, Flash Memory or any suitable memory card, etc. The method may also be at least partially implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A method for transforming XSS-vulnerable web application output into CSP-compliant XSS-invulnerable web application output, the method comprising:

parsing the XSS-vulnerable web application output containing interleaved script and presentation (HTML) markup to identify the script code and the presentation code;

splitting the script code and the presentation code to define the CSP-compliant XSS-invulnerable web application output by generating, for a presentation layer, HTML output that is identical in presentation to the XSS-vulnerable web application output but with XSS-safe references to script components, generating a separate script file that contains all script code required to maintain complete functionality of the XSS-vulnerable web application output, updating headers to include proper Content-Security-Policy (CSP) headers, computing a hash of the script code, and adding the hash to the CSP headers; and serving the CSP-compliant XSS-invulnerable web application output to a client.

2. The method of claim 1 further comprising moving an event listener to the separate script file.

3. The method of claim 1 further comprising dynamically generating an identifier for the event listener in the separate script file.

4. The method of claim 1, wherein the method is performed by a cloud service.

5. The method of claim 1, wherein the method is performed by a server cluster.

6. The method of claim 1, wherein the method is performed by a server.

7. A system for transforming XSS-vulnerable web application output into CSP-compliant XSS-invulnerable web application output, the system comprising:

at least one hardware processor and memory;

a parser to parse the XSS-vulnerable web application output containing interleaved script code and presentation code and to identify the script code and the presentation code, wherein the parser splits the script code and the presentation code to define the CSP-compliant XSS-invulnerable web application output, and wherein the parser is configured to generate, for a presentation layer, HTML output that is identical in presentation to the XSS-vulnerable web application output but with XSS-safe references to script components, generate a separate script file that contains all script code required to maintain complete functionality of the XSS-vulnerable web application output, and update headers to include proper Content-Security-Policy (CSP) headers;

a server to serve the CSP-compliant XSS-invulnerable web application output to a client; and a hashing component to compute a hash of the script code, and add the hash to the CSP headers.

8. The system of claim 7, wherein the parser is further configured to move an event listener to the separate script file.

9. The system of claim 8, wherein the parser is further configured to dynamically generate an identifier for the event listener in the separate script file.

10. The system of claim 7, wherein the system comprises a cloud service.

11. The system of claim 7, wherein the system comprises a server cluster.

12. The system of claim 7, wherein the system comprises a server.

\* \* \* \* \*